United States Patent
Wojatzki et al.

(10) Patent No.: US 8,550,420 B2
(45) Date of Patent: Oct. 8, 2013

(54) POSITIVELY ENGAGED LOCKING SYSTEM FOR A VEHICLE SEAT

(75) Inventors: Michael Wojatzki, Ennigerloh (DE); Klaus Walter, Paderborn (DE); Andre Schebaum, Steinhagen (DE); Marc Laumeier, Langenberg (DE); Joerg Sternberg, Rheda-Wiedenbru (DE); Hans-Peter Mischer, Bad Meinberg (DE); Christian Ruthman, Herzebrock-Clarholz (DE)

(73) Assignee: Lear Corporation, Southfield, MI (US)

( * ) Notice: Subject to any disclaimer, the term of this patent is extended or adjusted under 35 U.S.C. 154(b) by 208 days.

(21) Appl. No.: 12/864,919

(22) PCT Filed: Dec. 18, 2009

(86) PCT No.: PCT/US2009/068704
§ 371 (c)(1),
(2), (4) Date: Jul. 28, 2010

(87) PCT Pub. No.: WO2010/080601
PCT Pub. Date: Jul. 15, 2010

(65) Prior Publication Data
US 2010/0327139 A1    Dec. 30, 2010

Related U.S. Application Data

(60) Provisional application No. 61/138,829, filed on Dec. 18, 2008.

(51) Int. Cl.
*F16M 13/00*    (2006.01)
(52) U.S. Cl.
USPC .................... 248/429; 296/65.13; 297/344.11
(58) Field of Classification Search
USPC ........... 248/424, 429, 430; 296/65.13, 65.15; 297/344.1, 344.11
See application file for complete search history.

(56) References Cited

U.S. PATENT DOCUMENTS

| 4,189,957 A | 2/1980 | Gibig et al. |
| 4,712,759 A | 12/1987 | Sugama et al. |

(Continued)

FOREIGN PATENT DOCUMENTS

| DE | 3042379 C2 | 6/1982 |
| DE | 4242895 C1 | 11/1993 |

(Continued)

OTHER PUBLICATIONS

International Search Report for PCT/US2009/068704 dated May 31, 2010.

*Primary Examiner* — Bradley Duckworth
(74) *Attorney, Agent, or Firm* — MacMillan, Sobanski & Todd, LLC

(57) ABSTRACT

A vehicle seat track assembly includes a first track having first and second spaced apart walls. Each of the first and second walls include a plurality of openings formed therein. A second track is slidably mounted relative to the first track. The vehicle seat track assembly further has a locking mechanism including a first pin carried by the second track and slidably movable between an engaged position such that the first pin extends through one of the plurality of openings formed in the first wall of the first track and a disengaged position such that the first pin is retracted from the plurality of openings formed in the first wall of the first track. A second pin is carried by the second track and is slidably movable between an engaged position such that the second pin extends through one of the plurality of openings formed in the second wall of the first track and a disengaged position such that the second pin is retracted from the plurality of openings formed in the second wall of the first track. The first and second pins are movable in directions different from one another when moving into their respective engaged positions.

20 Claims, 8 Drawing Sheets

(56) References Cited

U.S. PATENT DOCUMENTS

| | | | |
|---|---|---|---|
| 4,730,804 A | 3/1988 | Higuchi et al. | |
| 5,596,910 A | 1/1997 | Bauer et al. | |
| 5,772,173 A * | 6/1998 | Couasnon | 248/430 |
| 6,098,946 A | 8/2000 | Sechet et al. | |
| 6,113,051 A | 9/2000 | Moradell et al. | |
| 6,231,022 B1 | 5/2001 | Becker et al. | |
| 6,322,036 B1 | 11/2001 | Tame et al. | |
| 6,354,553 B1 | 3/2002 | Lagerweij et al. | |
| 6,637,712 B1 | 10/2003 | Lagerweij | |
| 6,648,292 B2 * | 11/2003 | Flick et al. | 248/430 |
| 6,688,574 B2 | 2/2004 | Okazaki et al. | |
| 6,874,747 B2 | 4/2005 | Oh | |
| 6,892,995 B2 | 5/2005 | Tame et al. | |
| 6,981,681 B2 | 1/2006 | Matsumoto | |
| 7,066,521 B2 | 6/2006 | Jung et al. | |
| 7,191,995 B2 | 3/2007 | Kim | |
| 7,207,541 B2 | 4/2007 | Frohnhaus et al. | |
| 7,328,877 B2 | 2/2008 | Yamada et al. | |
| 7,780,138 B1 * | 8/2010 | Lee et al. | 248/429 |
| 8,215,602 B2 * | 7/2012 | Walter et al. | 248/424 |
| 2003/0164434 A1 * | 9/2003 | Frohnhaus et al. | 248/430 |
| 2005/0021319 A1 | 1/2005 | Li et al. | |
| 2006/0053145 A1 | 3/2006 | Salminen et al. | |
| 2006/0131470 A1 * | 6/2006 | Yamada et al. | 248/424 |
| 2006/0261237 A1 | 11/2006 | Noffz | |
| 2007/0090263 A1 | 4/2007 | Yamada et al. | |
| 2008/0163717 A1 | 7/2008 | Weber | |
| 2009/0114793 A1 | 5/2009 | Brewer et al. | |
| 2009/0218843 A1 * | 9/2009 | Wojatzki et al. | 296/65.13 |
| 2011/0193389 A1 * | 8/2011 | Wojatzki et al. | 297/344.1 |
| 2012/0074287 A1 * | 3/2012 | Wojatzki et al. | 248/429 |

FOREIGN PATENT DOCUMENTS

| | | |
|---|---|---|
| DE | 4337293 C1 | 12/1994 |
| DE | 29723564 U1 | 11/1998 |
| EP | 0408932 B1 | 1/1991 |
| FR | 2919234 A1 | 1/2009 |
| JP | 07304361 A | 11/1995 |
| WO | WO2005021319 A2 | 3/2005 |
| WO | WO2006053145 A1 | 5/2006 |

* cited by examiner

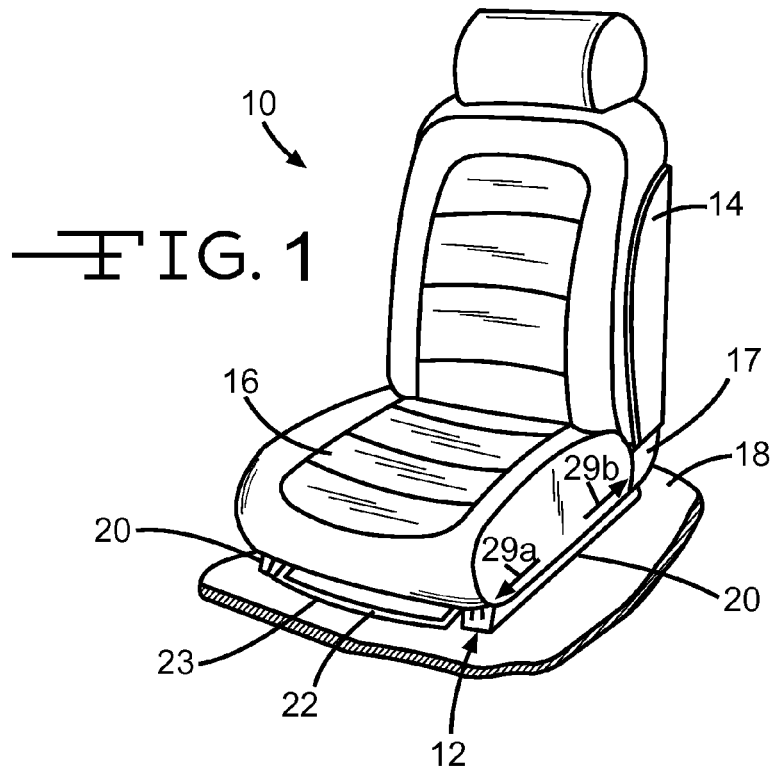
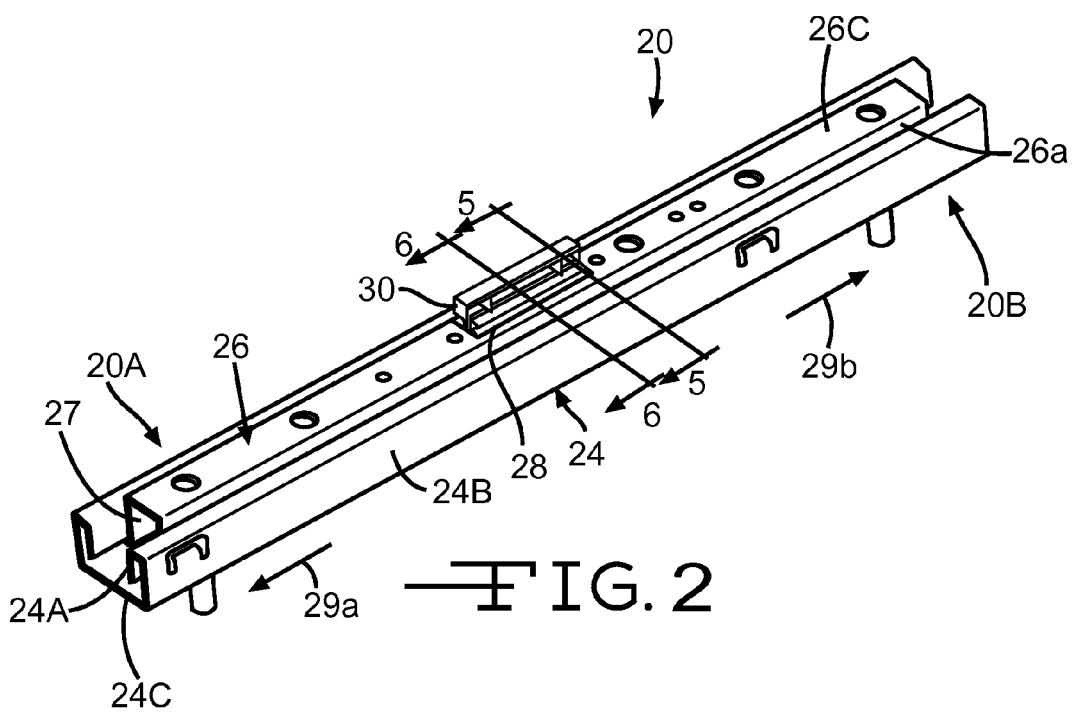

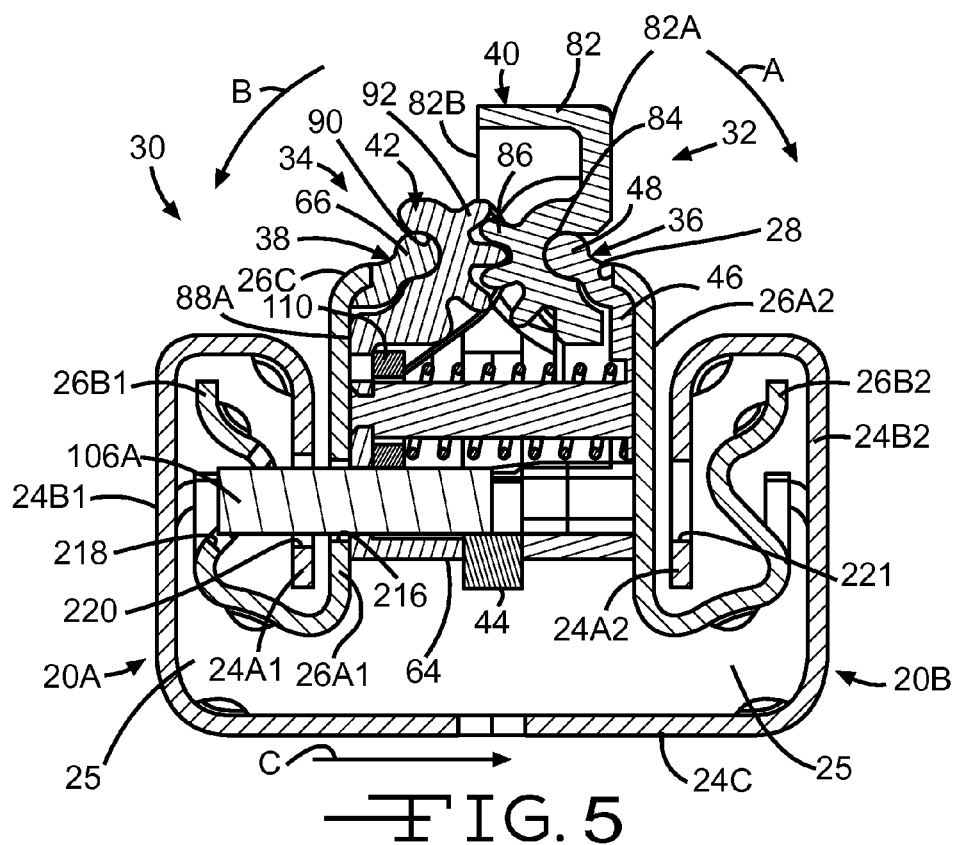
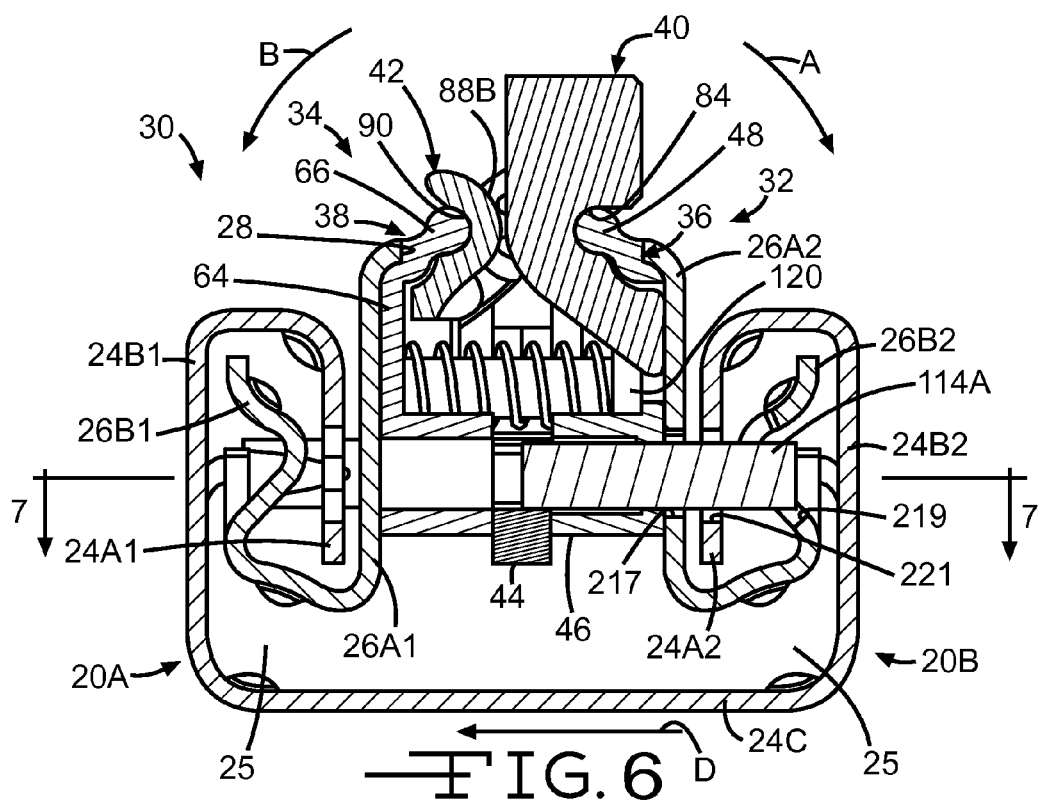

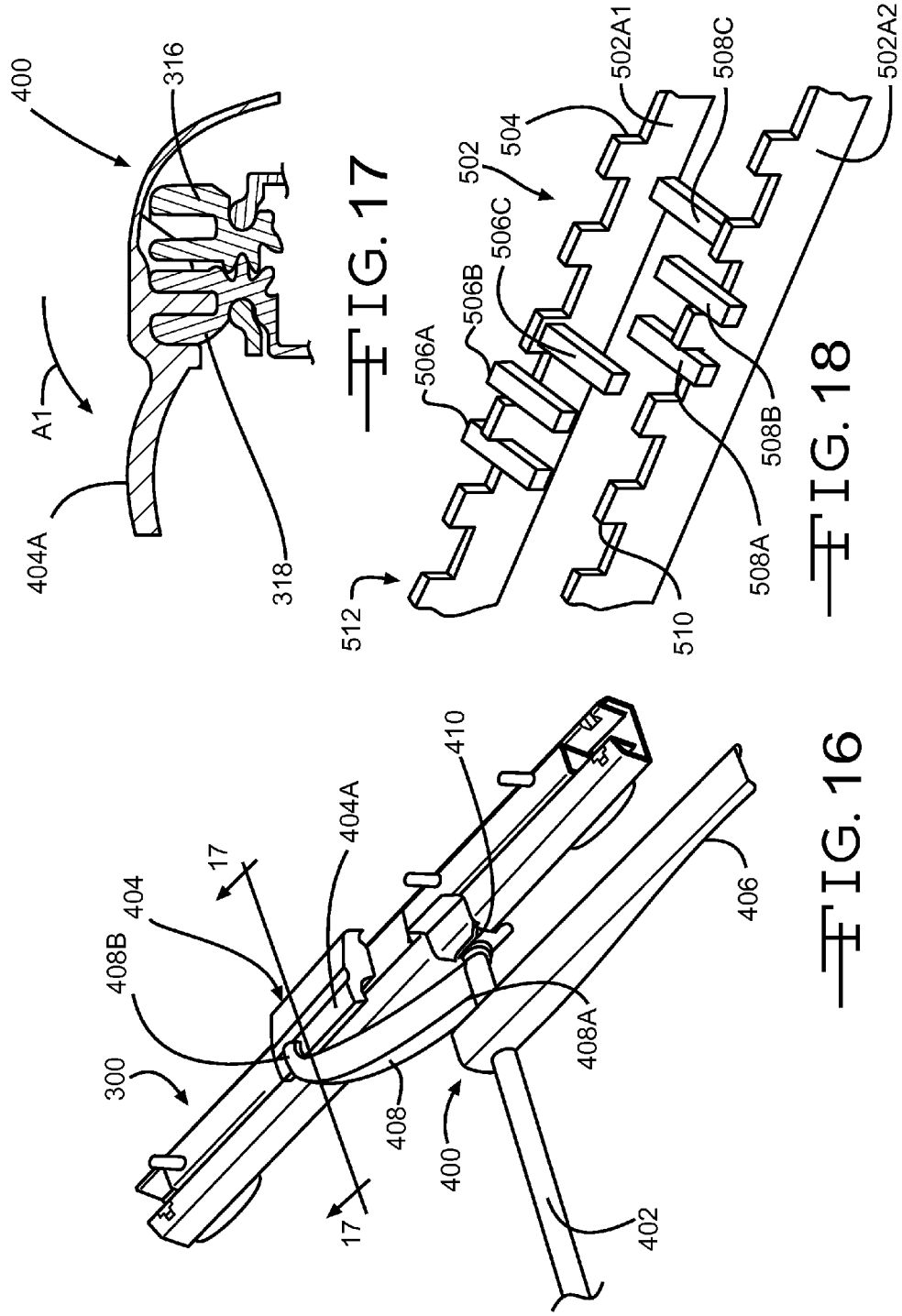

POSITIVELY ENGAGED LOCKING SYSTEM FOR A VEHICLE SEAT

CROSS REFERENCE TO RELATED APPLICATIONS

This application claims the benefit of U.S. Provisional Application No. 61/138,829 filed Dec. 18, 2008.
Inventors: Michael Wojatzki, Klaus Walter, Andre Schebaum, Marc Laumeier, Joerg Sternberg, Hans-Peter Mischer, and Christian Ruthman.

BACKGROUND

Various embodiments of a seat track mechanism are described herein. In particular, the embodiments described herein relate to an improved positively engaged locking (PEL) system or mechanism for a vehicle. Vehicles commonly include seats that are movably mounted on a vehicle floor to provide an adjustable position of the seat relative to the vehicle floor in a fore and aft direction. For example, the occupant of the driver's seat may want to adjust his or her position relative to the steering wheel and brake and accelerator pedals. The vehicle seat may be mounted on tracks for slidably moving the seat in the fore and aft direction along the vehicle floor. Commonly, a pair of track assemblies is mounted on the underside of the seat between the vehicle floor and the seat bottom. One track assembly is generally mounted on the inboard side of the seat, and the other track assembly is generally mounted on the outboard side of the seat. A typical track assembly includes a lower track bolted to the vehicle floor. An upper track is mounted on the seat. The upper track is slidably mounted on the lower track. Ball or roller bearings are commonly provided between portions of the tracks for ease of moving the upper track relative to the lower track.

The track assemblies include a locking assembly which prevents the tracks from moving relative to one another during normal usage of the seat. When the user wants to move the seat position, the user actuates the locking assembly to an unlatched position, thereby permitting the seat to be moved to a desired position. After the seat is in its desired position, the user then actuates the locking assembly to its latched position, thereby preventing the seat from moving relative to the floor. U.S. Pat. Nos. 6,874,747 and 7,191,995 illustrate examples of known track assemblies which use an actuating mechanism mounted on the outside of the tracks for moving engagement pins into and out of openings formed in the tracks to provide for locked and unlocked conditions. Such track assemblies may require clearance and spacing adjacent the actuating mechanism to prevent obstruction of the operation of the track assembly. U.S. Pat. No. 6,637,712 illustrates an example of a known track mechanism that uses pins slidably mounted in a vertical orientation wherein the pins extend underneath the tracks when in their locked position. Such a track assemblies may require clearance from the vehicle floor to operate and is susceptible to obstruction hindering the operation of the track assembly.

SUMMARY

The present application describes various embodiments of a vehicle seat track assembly. One embodiment of the vehicle seat track assembly includes a first track having first and second spaced apart walls. Each of the first and second walls include a plurality of openings formed therein. A second track is slidably mounted relative to the first track. The vehicle seat track assembly further has a locking mechanism including a first pin carried by the second track and slidably movable between an engaged position such that the first pin extends through one of the plurality of openings formed in the first wall of the first track and a disengaged position such that the first pin is retracted from the plurality of openings formed in the first wall of the first track. A second pin is carried by the second track and is slidably movable between an engaged position such that the second pin extends through one of the plurality of openings formed in the second wall of the first track and a disengaged position such that the second pin is retracted from the plurality of openings formed in the second wall of the first track. The first and second pins are movable in directions different from one another when moving into their respective engaged positions.

Other advantages of the vehicle seat track assembly will become apparent to those skilled in the art from the following detailed description, when read in light of the accompanying drawings.

BRIEF DESCRIPTION OF THE DRAWINGS

FIG. 1 is a perspective view of a vehicle seat including a seat track mechanism in accordance with the present invention.

FIG. 2 is an enlarged perspective view of a first embodiment of a seat track assembly of the seat track mechanism illustrated in FIG. 1.

FIG. 5 is an enlarged cross-sectional view of the PEL taken along the line 5-5 in FIG. 2.

FIG. 6 is an enlarged cross-sectional view of the PEL taken along the line 6-6 in FIG. 2.

FIG. 16 is a perspective view of one embodiment of a PEL actuator mounted to the second embodiment of the seat track assembly illustrated in FIG. 8.

FIG. 17 is an enlarged cross-sectional view the PEL actuator taken along the line 17-17 of FIG. 16.

FIG. 18 is a schematic perspective view of a third embodiment of the lower track of the seat track assembly illustrated in FIG. 8.

DETAILED DESCRIPTION

Figure 3:
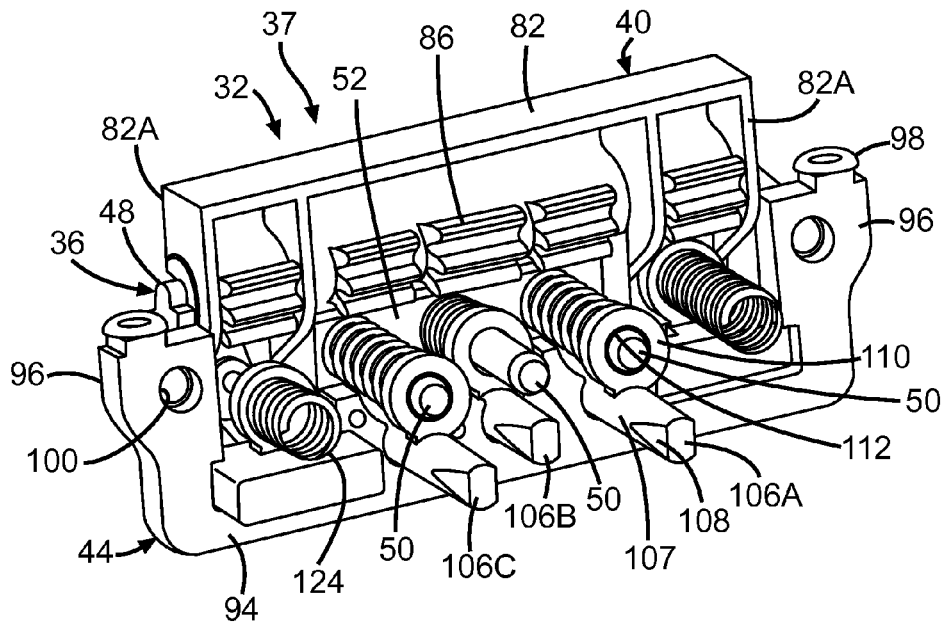
FIG. 3 is an enlarged perspective view of a first portion of the positively engaged locking system (PEL) illustrated in FIG. 2.

Referring now to the drawings, there is illustrated in FIG. 1 a vehicle seat, indicated generally at 10, including a seat track mounting assembly or seat track assembly, indicated generally at 12. The vehicle seat 10 can be any conventional seat design and may include a seat back 14 and a seat bottom 16. The seat back 14 may be pivotally mounted on the seat bottom 16 via a recliner mechanism 17 such that the seat back 14 can be positioned at selected recline angles relative to the seat bottom 16. The seat track mounting assembly 12 is attached to an underside of the seat bottom 16 and is adapted to be mounted on a vehicle floor 18.

The seat track mounting assembly 12 generally includes a pair of seat track assemblies, each indicated generally at 20, and a single release handle 22, commonly referred to in the industry as a towel bar. The seat track assemblies 20 are mounted on each side of the vehicle seat 10, as shown in FIG. 1. The seat track assemblies 20 permit selective sliding movement of the vehicle seat 10 relative to the floor 18 in a longitudinal direction. More specifically, the vehicle seat 10 may travel in a forward or fore direction 29a and a rear or aft direction 29b. As will be discussed below, the seat track mechanism 12 can be operated via the release handle 22 between a locked position, wherein the seat 10 is prevented from moving relative to the floor 18, and an unlocked position, wherein the seat 10 is permitted to be moved in the fore and aft directions 29a and 29b relative to the vehicle floor 18.

As illustrated in FIG. 2, one of the seat track assemblies 20 has a first or pin side 20A and a second or plate side 20B, and includes a first or lower rail or track 24 and a second or upper rail or track 26. The lower and upper tracks 24 and 26 are slidably mounted on one another. The tracks 24 and 26 are generally elongated in shape and are arranged such they extend along the fore and aft directions 29a and 29b. The lower track 24 is adapted to be attached to the vehicle floor 18, such as by a bolt or other fastener. The upper track 26 is attached to the seat bottom 16, such as on its underside. As will be discussed below, the lower and upper tracks 24 and 26 are configured to accept bearings disposed between them for supporting the tracks 24 and 26 together. The bearings also provide for a relatively low friction sliding motion between the tracks 24 and 26. The lower track 24 has a generally U-shaped cross section. The upper track 26 has an inverted generally U-shaped cross section. When connected together, an interior space or cavity 27 is defined between the tracks 24 and 26. The tracks 24 and 26 may be made of any suitable material, such as metal, and may be formed by any suitable manner, such as by stamping. The lower track 24 includes a plurality of openings 220 and 221 formed therein (best shown in FIG. 7), the reasons for which will be explained in detail below. The plurality of openings 220 and 221 are spaced from one another and positioned along the length of the lower track 24. At least one of the seat track assemblies 20 includes a locking mechanism. In the illustrated embodiment, the locking mechanism is a positively engaged locking (PEL) system or mechanism 30.

The seat track mounting assembly 12 may have a PEL 30 for each seat track assembly 20 or may have a single PEL 30 for only one of the two seat track assemblies. For simplicity, only one of the seat track assemblies 20 will be described herein, but it should be understood that the other seat track assembly 20 may also be configured in a similar manner.

The PEL 30 is connected to the release handle 22 and is operable by pivoting movement of the release handle 22. The release handle 22 is generally U-shaped defining a grasping portion 23 and a pair of leg portions (not shown) which extend from ends of the grasping portion 23.

Figure 4:
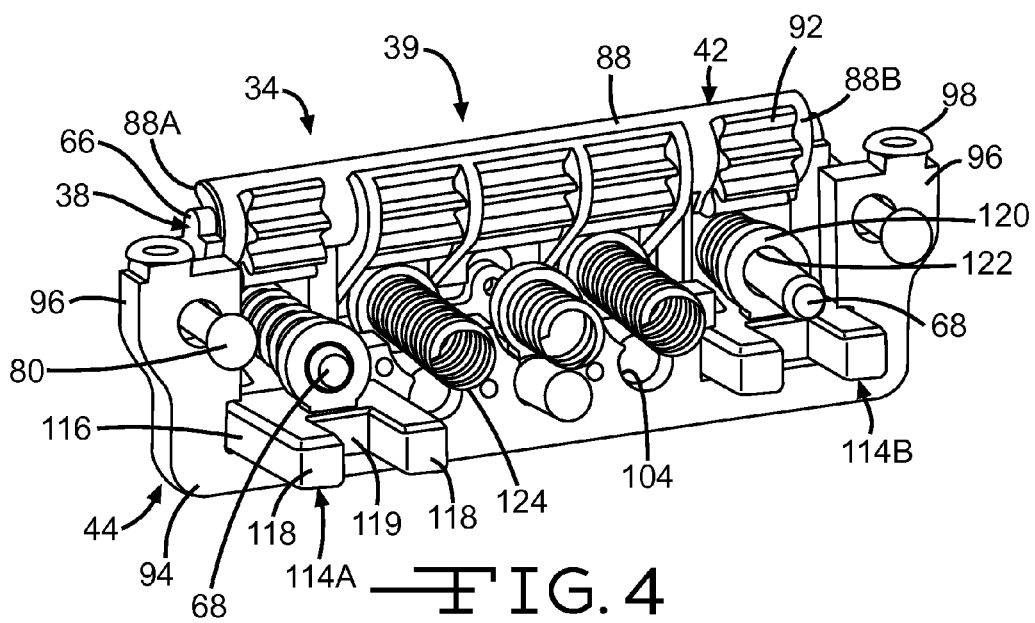
FIG. 4 is an enlarged perspective view of a second portion of the PEL illustrated in FIG. 2.

FIGS. 3 and 4 show first and second sides 32 and 34 of the PEL 30, respectively. The illustrated PEL 30 includes a first housing portion 36 and a second housing portion 38, both also shown in FIGS. 5 and 6. The illustrated PEL 30 also includes a first lever 40 and a second lever 42. The first and second housing portions 36 and 38, respectively, are mounted to a third housing portion or load bracket 44.

The first housing portion 36 includes a body 46 having an elongated pivot surface 48. In the illustrated embodiment, three spring guide posts 50 extend outwardly from an inner surface 52 (generally toward the right when viewing FIG. 3). Apertures may be formed through the body 46 through which plates 114A and 114B may extend.

The second housing portion 38 includes a body 64 having an elongated pivot surface 66. In the illustrated embodiment, two spring guide posts 68 extend outwardly from an inner surface 70 (generally toward the right when viewing FIG. 4). Apertures may be formed through the body 64 through which pins 106A, 106B, and 106C may extend.

The first lever 40, as shown in FIGS. 5 and 6, includes a body 82 having a first side 82A having a pivot groove 84 which pivotally engages the pivot surface 48. A second side 82B includes a plurality of first teeth 86.

The second lever 42, as also shown in FIGS. 5 and 6, includes a body 88 having a first side 88A having a pivot groove 90 which pivotally engages the pivot surface 66. A second side 88B includes a plurality of second teeth 92.

The load bracket 44 includes an elongated generally U-shaped body 94 having outwardly extending arms 96 and a plurality of pin grooves 104. Attachment posts 98 extend outwardly toward the upper track 26 for attaching the load bracket 44 to the upper track 26. Apertures 100 are formed in the arms 96 for receiving attachment pins 80.

The first housing portion 36, the first lever 40, and the springs 124 define a first actuator 37. The second housing portion 38, the second lever 42, and the springs 124 define a second actuator 39.

Figure 7:
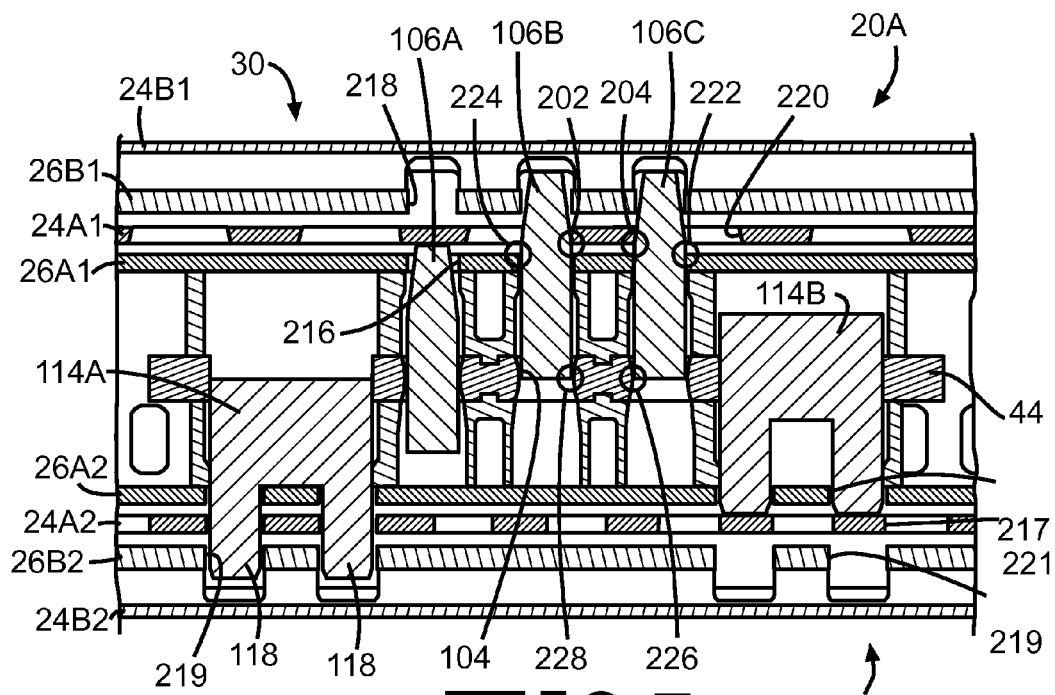
FIG. 7 is an enlarged cross-sectional view of the PEL taken along the line 7-7 in FIG. 6.

As best shown in FIGS. 3 and 7, the PEL 30 includes 3 pins, 106A, 106B, and 106C. The substantially cylindrical pins 106A, 106B, and 106C include a pin body 107 having a beveled end portion 108. A mounting ring 110 is attached to the pin body 107 and includes a ring aperture 112. The mounting rings 110 are slidably mounted on the posts 50.

As best shown in FIGS. 4 and 7, the PEL 30 includes 2 plates, 114A and 114B. The locking plates 114A and 114B include a plate body 116 having two substantially parallel fingers 118 extending outwardly thereof. The fingers define space 119 therebetween. A mounting ring 120 is attached to the plate body 116 and includes a ring aperture 122. The mounting rings 120 are slidably mounted on the posts 68. It will be understood that in the embodiments of the PEL described herein, the plates 114A and 114B function as a pair of connected pins.

FIG. 3 shows the first side 32 of the PEL 30 with the second housing portion 38 and the second lever 42 removed. In the illustrated embodiment, coil springs 124 are mounted on the spring guide posts 50 and 68 to bias the pins 106A, 106B, and 106C, and the plates 114A and 114B, respectively, outward of the load bracket 44. FIG. 4 shows the second side 34 of the PEL 30 with the first housing portion 36 and the first lever 40 removed. The coil springs 124 are also visible in FIG. 4. The housing portions 36 and 38, levers 40 and 42, load bracket 44, pins 106A, 106B, and 106C, and the plates 114A and 114B may be made of any suitable material, such as plastic. It will be understood that the PEL 30 further defines a sub-assembly of the seat track assembly 20.

Referring to FIGS. 2, 5 and 6, additional details of the tracks 24 and 26 will now be described. The upper track 26 may be structured and configured to slide relative to the lower track 24. If desired, the upper track 26 may be structured and configured to slide relative to the lower track 24 with the assistance of multiple balls or rollers (not shown) disposed between the tracks 24 and 26 in the space 25. The tracks 24 and 26 may have any suitable construction. On the pin side 20A of the seat track assembly 20, the upper track 26 includes a first wall 26A1 and a second wall 26B1. On the plate side 20B of the seat track assembly 20, the upper track 26 includes a first wall 26A2 and a second wall 26B2. The first walls 26A1 and 26A2 extend downwardly from lateral edges of a top plate 26C. The second walls 26B1 and 26B2 have a substantially serpentine cross-sectional shape and extend upwardly from a lower end of the walls 26A1 and 26A2, respectively.

In the illustrated embodiment, the upper track 26 includes a plurality of first openings 216 formed in the first wall 26A1, and a plurality of second openings 218 formed in the second wall 26B1, and horizontally aligned with the first openings 216. The openings 216 and 218 are spaced from one another along a portion of the length of the walls 26A1 and 26B1, respectively. The illustrated first openings 216 are substantially rectangular in shape, although the first openings 216 may have any other desired shape, such as a trapezoidal shape. The illustrated walls 26A1 and 26B1 have three openings formed therein. Alternatively, the upper track 26 may also have any desired number of first openings 216 and second openings 218 formed therein.

In the illustrated embodiment, the upper track 26 includes a plurality of first openings 217 formed in the first wall 26A2, and a plurality of second openings 219 formed in the second wall 26B2, and horizontally aligned with the first openings 217. The openings 217 and 219 are spaced from one another along a portion of the length of the walls 26A2 and 26B2, respectively. The illustrated first openings 217 are substantially rectangular in shape, although the first openings 217 may have any other desired shape, such as a trapezoidal shape. The illustrated walls 26A2 and 26B2 have four openings formed therein. Alternatively, the upper track 26 may also have any desired number of first openings 217 and second openings 219 formed therein.

On the pin side 20A of the seat track assembly 20, the lower track 24 includes a first wall 24A1 and a second wall 24B1. On the plate side 20B of the seat track assembly 20, the lower track 24 includes a first wall 24A2 and a second wall 24B2. The second walls 24B1 and 24B2 extend upwardly from lateral edges of a substantially planar base plate 24C. The first walls 26A1 and 26A2 are substantially parallel with the second walls 24B1 and 24B2.

In the illustrated embodiment, the lower track 24 includes a plurality of third openings 220 formed in the first wall 24A1. The lower track 24 also includes a plurality of third openings 221 formed in the first wall 24A2. The openings 220 are horizontally aligned with the first and second openings 216 and 218, and the openings 221 are horizontally aligned with the first and second openings 217 and 219. The wall 24A1 and 24A2 may have a relatively large number of openings 220 and 221, respectively, permitting numerous positions of the seat 10 relative to the vehicle floor 18 when locked, as will be explained below. The illustrated openings 220 and 221 are substantially rectangular in shape, although the openings 220 and 221 may have any other desired shape, such as a trapezoidal shape. The lower track 24 may have any desired number of third openings 220 and 221 formed therein.

In the illustrated embodiments, the PEL 30 is disposed within the cavity 27 of the track assembly 20 between the lower and upper tracks 22 and 26. A portion of the PEL 30, such as visible in FIG. 2, extends outwardly (upwardly when viewing FIGS. 2, 5, and 6) through an opening 28 formed in the top plate 26C of the upper track 26. An advantage of this configuration is that the PEL 30 occupies a smaller volume of space than a conventional locking mechanism in which most of the locking mechanism is located outside of the cavity 27.

FIGS. 5 and 6 are cross section elevational views of the longitudinal seat adjustment apparatus 22. FIG. 5 illustrates a first pin, such as the pin 106A, urged outwardly through the first wall 26A1, the first wall 24A1, and the second wall 26B1 a maximum distance.

FIG. 6 illustrates a locking plate, such as the locking plate 114A, urged outwardly through the first wall 26A2, the first wall 24A2, and the second wall 26B2 a maximum distance.

The first pin 106A is carried by the second or upper track 26 and is slidably movable between an engaged position such that the first pin 106A extends through one of the plurality of openings 220 formed in the first wall 24A1 of the lower track 24 and a disengaged position such that the first pin 106A is retracted from the opening 220. Similarly, the locking plate 114A is carried by the upper track 26 and is slidably movable between an engaged position such that the plate 114A extends through two of the openings 221 formed in the first wall 24A2 and a disengaged position such that the plate 114A is retracted from the openings 221.

In operation, as best shown in FIG. 5, the first lever 40 may be rotated by a portion of a PEL actuator such as the release handle 406 of the PEL actuator 400 shown in FIG. 16, in the direction of the arrow A (clockwise when viewing FIGS. 5 and 6), thereby causing the second lever 42 to rotate in the direction of the arrow B (counterclockwise when viewing FIGS. 5 and 6). As best shown in FIG. 6, the first lever 40 then contacts the mounting ring 120 of the plates 114A, 114B, and urges the plates 114A, 114B inwardly (in the direction of the arrow D), and causing the plates 114A, 114B to disengage the second wall 26B2 and the first wall 24A2. Likewise, as best shown in FIG. 5, the second lever 42 contacts the mounting ring 110 of the pins 106A, 106B, 106C, and urges the pins 106A, 106B, 106C inwardly (in the direction of the arrow C), and causing the pins 106A, 106B, 106C to disengage the second wall 26B1 and the first wall 24A1. When the pins 106A, 106B, 106C, and the plates 114A and 114B are disengaged from the second walls 26B1 and 26B2, and the first walls 24A1 and 24A2, the upper track 26 can slide relative to the lower track 24.

In the embodiments illustrated herein, three pins 106A, 106B, 106C are provided. The three pins 106A, 106B, 106C substantially eliminate free-play. After the release handle 406 is released, and the pins 106A, 106B, 106C and the plates 114A and 114B of the PEL 30 are urged into positions engaging the walls 26A1, 26A2, 24A1, 24A2, and the load bracket 44 (such as shown in FIG. 7), at least two of the pins 106A, 106B, 106C (the pins 106B and 106C in FIG. 7) will always engage both the upper track 26 and the lower track 24. Therefore, when the seat 16 is moved forwardly or rearwardly, at least two pins 106A, 106B, 106C will engage both the upper track 26 and the lower track 24, thereby substantially eliminating free-play.

In the embodiments illustrated herein, when the release handle 406 is released, one of the plates (the plate 114A in FIG. 7), extends through the openings 217, 221, and 219 in each of the three walls 26A2, 24A2, and 26B2 respectively, thus further securing the upper track 26 relative to the lower track 24. The plate 114A also acts to substantially reduce bending force on the walls, 26A2, 24A2, and 26B2 that may occur during an impact or crash event.

Advantageously, the operation of the PEL 30 is split such that the pins 106A, 106B, 106C extend outwardly toward, and engage the pin side 20A of the track assembly 20, and the plates 114A and 114B extend outwardly toward, and engage a plate side 20B opposite the pin side 20A.

FIG. 7 illustrates exemplary alternate positions of the pins 106A, 106B, 106C and the plates 114A and 114B relative to the tracks 24 and 26 depending on the relative positions of the first, second, and third openings 216, 217, 218, 219, 220, and 221.

For example, FIG. 7 shows the plate 114A fully outwardly extended such that the fingers 118 extend through the walls 26A2, 24A2, and 26B2, while the plate 114B extends only through the wall 26A2.

In the embodiment illustrated in FIG. 7, the pins 106B and 106C are urged outwardly a maximum distance through the walls 26A1, 24A1, and 26B2, such that a surface of the pins 106B and 106C engage openings 220 of the wall 24A1 at points of contact indicated at 202 and 204, respectively, thereby urging the pins 106B and 106C slightly laterally outwardly (i.e., substantially perpendicularly to a longitudinal axis of the pins 106B and 106C). The pins 106B and 106C are thereby urged slightly laterally into engagement with the openings 216 as indicated at 222 and 224. An end of the pin 106A will also engage the wall 24A1.

Advantageously, as shown in FIG. 7, each pin 106B and 106C engages the PEL 30 at three points. The pins 106B and 106C further engage the grooves 104 of the load bracket 44 at the contact points 226 and 228.

The three points of contact of the pins 106B and 106C with the PEL 30, and the positions of each pin relative the other, wherein the longitundinal axis of the pins 106B and 106C are not parallel, ensure that each pin 106B and 106C remain engaged at three contact points each, thereby substantially eliminating free play of the seat track assembly 20.

Advantageously, the PEL 30 is structured such that when the PEL 30 is in a locked position, two of the pins 106A, 106B, and 106C are always extended a maximum distance outwardly and engage the PEL at three points of contact as shown in FIG. 7.

Figure 8:
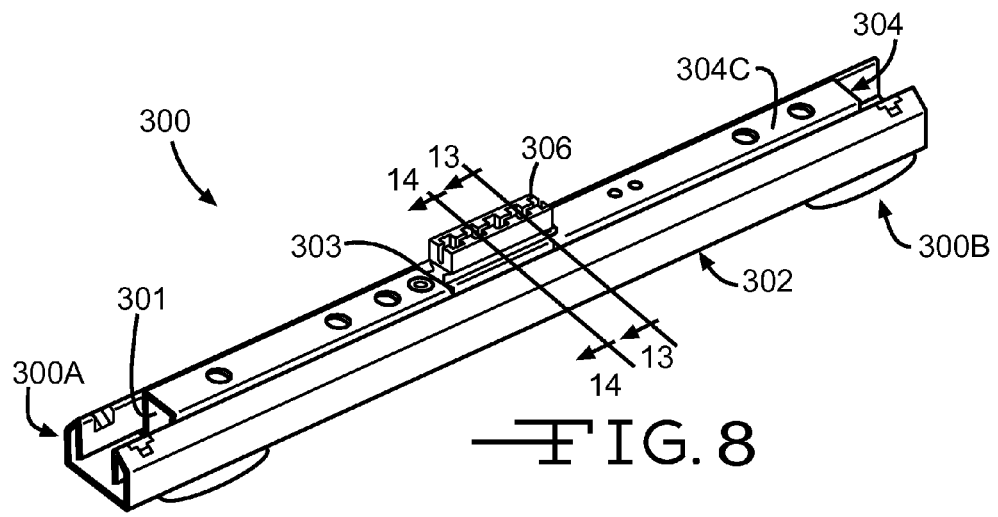
FIG. 8 is an enlarged perspective view of a second embodiment of the seat track assembly of the seat track mechanism illustrated in FIG. 1.

Referring now to FIG. 8, a second embodiment of a seat track assembly is shown generally at 300. The seat track assembly 300 has a first or free-play elimination side 300A and a second or load side 300B, and includes a first seat support member or lower track 302 that is attachable to the vehicle 14, and a second seat support member or upper track 304 that is attached to the seat bottom 16 and movable longitudinally with respect to the lower track 302. The seat track assembly 300 further includes a second embodiment of the positively engaged locking system or PEL 306.

Figure 9:
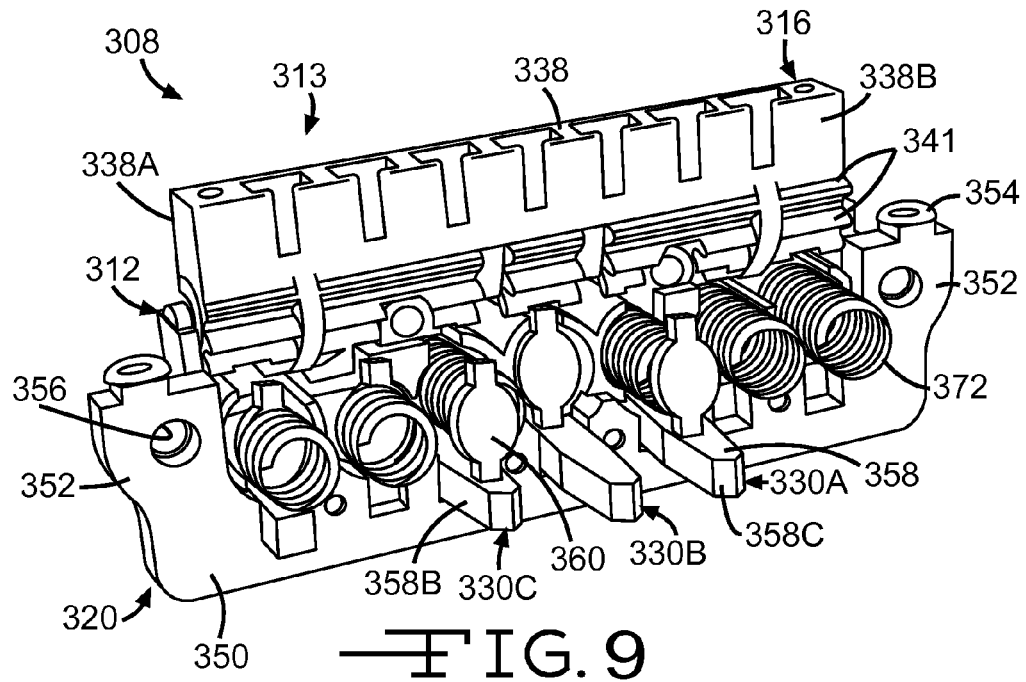
FIG. 9 is an enlarged perspective view of a first portion of the PEL illustrated in FIG. 8.
Figure 10:
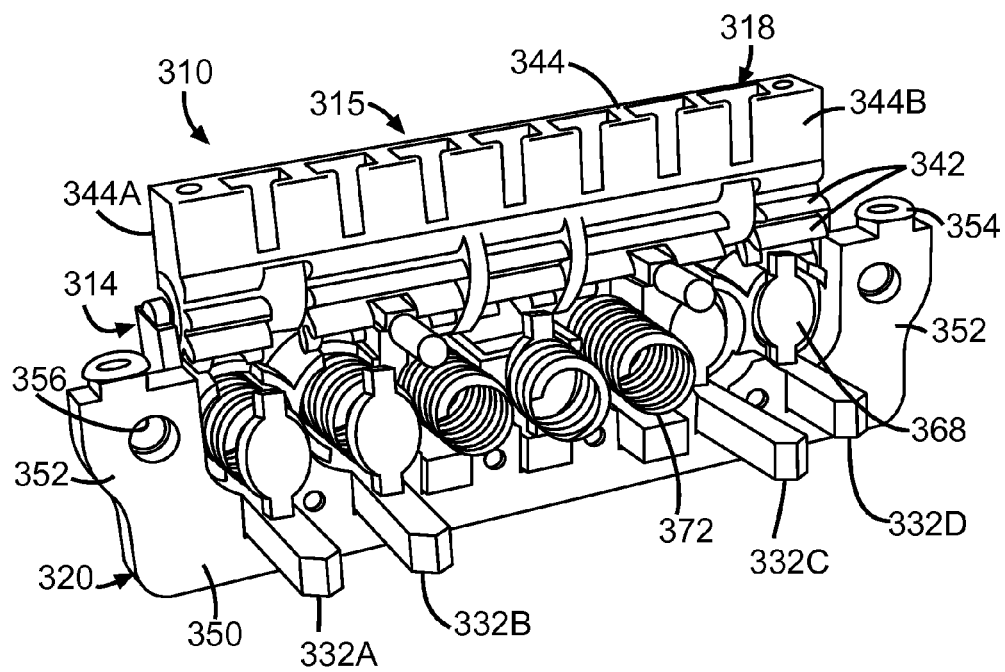
FIG. 10 is an enlarged perspective view of a second portion of the PEL illustrated in FIG. 8.

FIGS. 9 and 10 show first and second sides 308 and 310 of the PEL 306, respectively. The illustrated PEL 306 includes a first housing portion 312 and a second housing portion 314, both also shown in FIGS. 13 and 14. The illustrated PEL 306 also includes a first lever 316 and a second lever 318. The first and second housing portions 312 and 314, respectively, are mounted to a third housing portion or load bracket 320.

The first housing portion 312 includes a body 322 having an elongated pivot surface 324. Apertures may be formed through the body 322 through which free play elimination pins 330A, 330B, and 330C, and locking pins 332A, 332B, 332C, and 332D may extend. The second housing portion 314 includes a body 334 having an elongated pivot surface 336. Apertures may be formed through the body 334 through which the pins 330A, 330B, and 330C, and the pins 332A, 332B, 332C, and 332D may extend.

Figure 13:
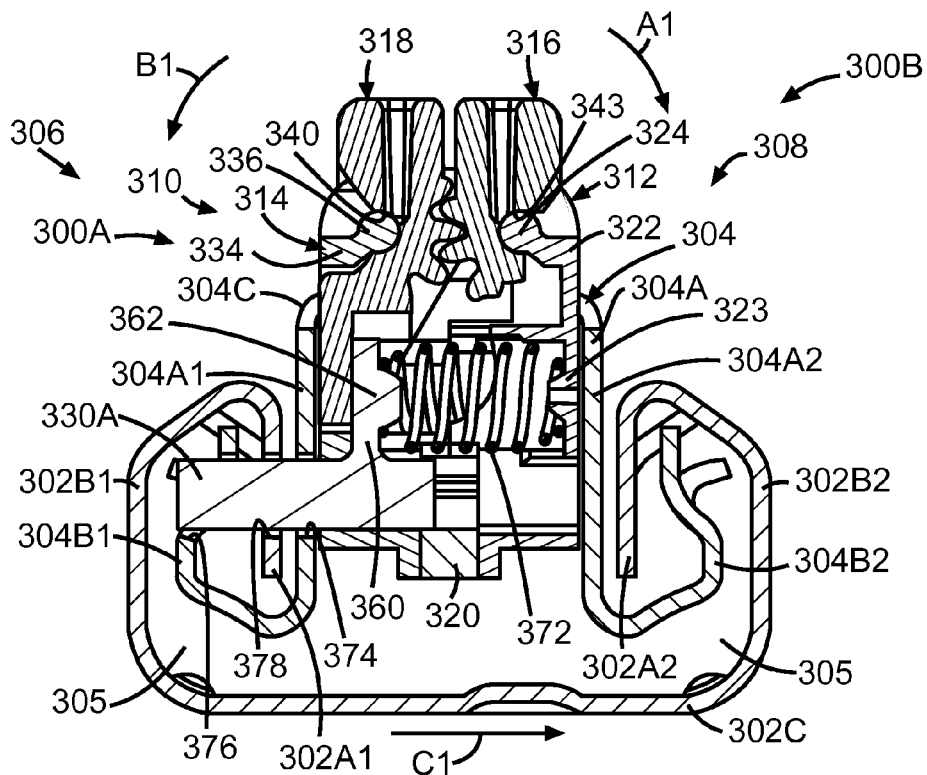
FIG. 13 is an enlarged cross-sectional view of the PEL taken along the line 13-13 in FIG. 8.
Figure 14:
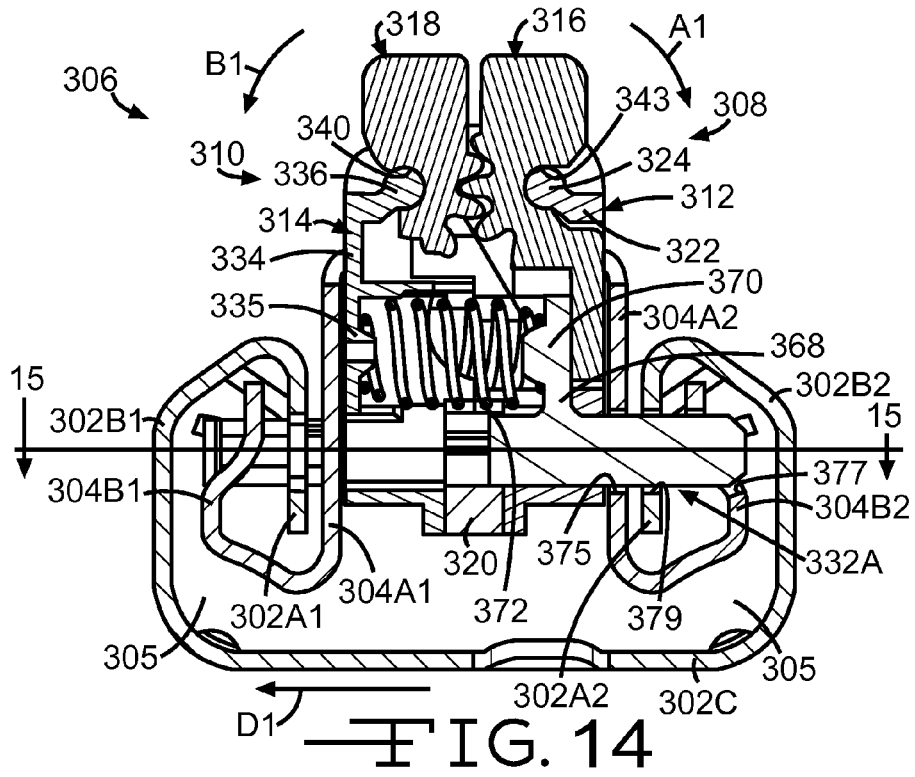
FIG. 14 is an enlarged cross-sectional view of the PEL taken along the line 14-14 in FIG. 8.

The first lever 316, as shown in FIGS. 13 and 14, includes a body 338 having a first side 338A having a pivot groove 343 which pivotally engages the pivot surface 324. A second side 338B includes a plurality of first teeth 341.

The second lever 318, as also shown in FIGS. 13 and 14, includes a body 344 having a first side 344A having a pivot groove 340 which pivotally engages the pivot surface 336. A second side 338B includes a plurality of second teeth 342.

The load bracket 320 includes an elongated generally U-shaped body 350 having outwardly extending arms 352. Attachment posts 354 extend outwardly toward the upper track 304 for attaching the load bracket 320 to the upper track 304. Apertures 356 are formed in the arms 352 for receiving attachment pins (not shown) for attaching the body 350 to the first and second housing portions 312 and 314, respectively.

The first housing portion 312, the first lever 316, and the springs 372 define a first actuator 313. The second housing portion 314, the second lever 318, and the springs 372 define a second actuator 315.

Figure 15:
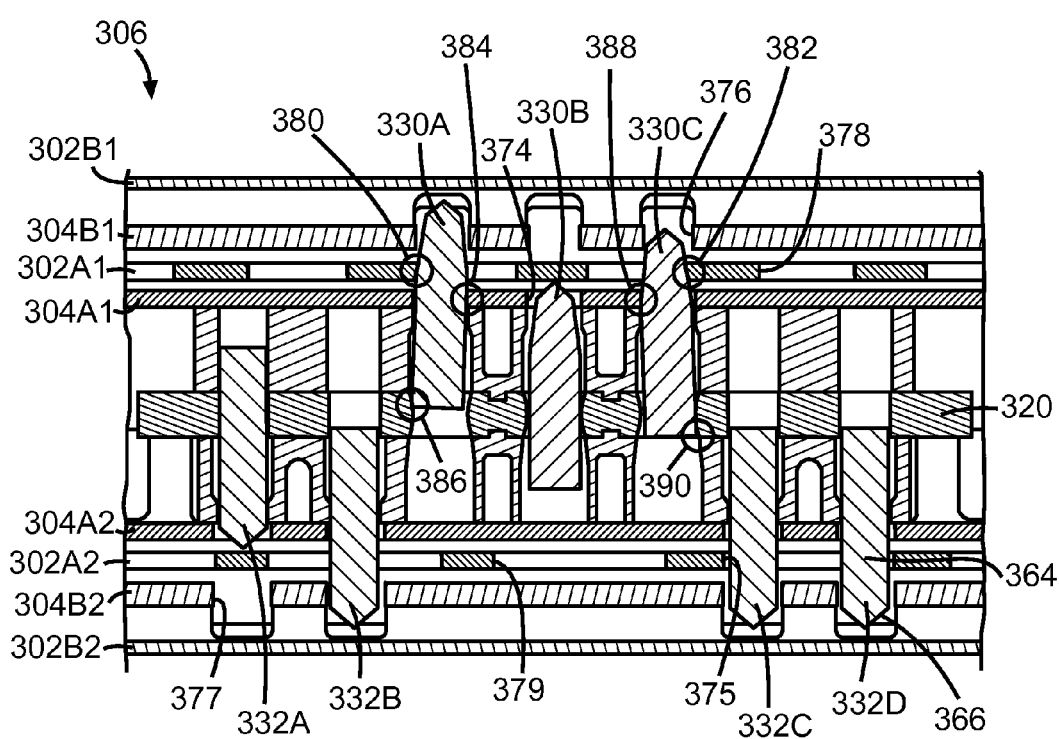
FIG. 15 is an enlarged cross-sectional view of the PEL taken along the line 15-15 in FIG. 14.
Figure 12:
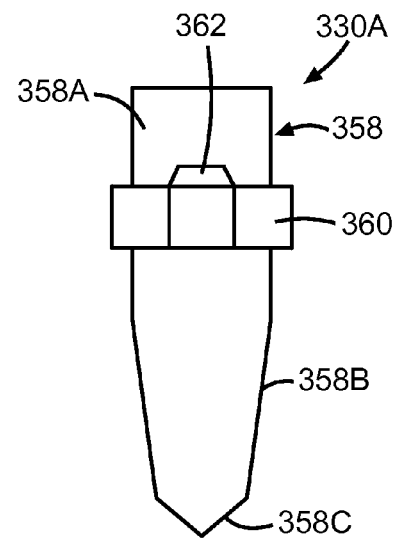
FIG. 12 is an enlarged plan view of the free-play elimination pin illustrated in FIG. 9.

As best shown in FIGS. 9, 12, and 15, the pins 330A, 330B, and 330C are identical and include a pin body 358. The pin body 358 has a first portion 358A having a substantially rectangular transverse section, a longitudinally tapered second portion 358B, and a tapered end portion 358C. A spring flange 360 extends outwardly from the pin body 358 (upwardly when viewing FIG. 13). A spring mounting boss 362 extends outwardly from the spring flange 360 (to the right when viewing FIG. 13).

Figure 11:
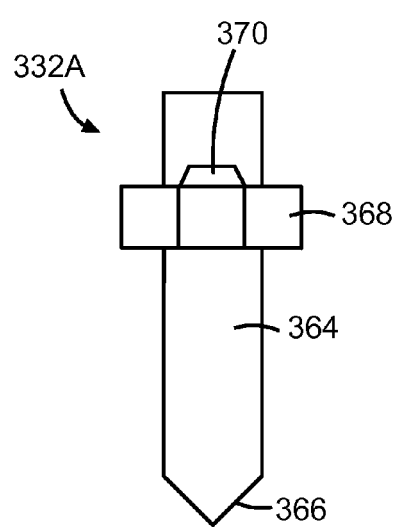
FIG. 11 is an enlarged plan view of the load pin illustrated in FIG. 10.

As best shown in FIGS. 10, 11, and 15, the PEL 306 includes four load or locking pins 332A, 332B, 332C, and 332D. The locking pins 332A, 332B, 332C, and 332D are identical and include a pin body 364. The pin body 364 has a substantially rectangular transverse section and a tapered end portion 366. A spring flange 368 extends outwardly from the pin body 364 (upwardly when viewing FIG. 14). A spring mounting boss 370 extends outwardly from the spring flange 368 (to the left when viewing FIG. 14).

FIG. 9 shows the first side 308 of the PEL 306 with the second housing portion 314 and the second lever 318 removed. In the illustrated embodiment, coil springs 372 extend between a spring boss 323 on the first housing portion 312 and the spring flange 360 of the pins 330A, 330B, and 330C. As best shown in FIG. 13, the springs 372 are seated on the spring mounting bosses 362 of each pin 330A, 330B, and 330C. The springs 372 bias the free play elimination pins 330A, 330B, and 330C outward of the load bracket 320.

FIG. 10 shows the second side 310 of the PEL 306 with the first housing portion 312 and the first lever 316 removed. The coil springs 372 also extend between a spring boss 335 on the second housing portion 314 and the spring flange 368 of the locking pins 332A, 332B, 332C, and 332D. As best shown in FIG. 14, the springs 372 are seated on the spring mounting bosses 370 of each locking pins 332A, 332B, 332C, and 332D. The springs 372 bias the locking pins 332A, 332B, 332C, and 332D outward of the load bracket 320. It will be understood that the PEL 306 further defines a sub-assembly of the seat track assembly 300.

Referring to FIGS. 9, 13, and 14, additional details of the tracks 302 and 304 will now be described. The upper track 304 may be structured and configured to slide relative to the lower track 302. If desired, the upper track 304 may be structured and configured to slide relative to the lower track 302 with the assistance of multiple balls or rollers (not shown) disposed between the tracks 302 and 304 in the space 305.

On the free-play side 300A of the seat track assembly 300, the upper track 304 includes a first wall 304A1 and a second wall 304B1. On the plate side 300B of the seat track assembly 300, the upper track 304 includes a first wall 304A2 and a second wall 304B2. The first walls 304A1 and 304A2 extend downwardly from lateral edges of a top plate 304C. The second walls 304B1 and 304B2 have a substantially serpentine cross-sectional shape and extend upwardly from a lower end of the walls 304A1 and 304A2, respectively.

In the illustrated embodiment, the upper track 304 includes a plurality of first openings 374 formed in the first wall 304A1, and a plurality of second openings 376 formed in the second wall 304B1, and horizontally aligned with the first openings 374. The openings 374 and 376 are spaced from one another along a portion of the length of the walls 304A1 and 304B1, respectively. The illustrated first openings 374 are substantially rectangular in shape, although the first openings 374 may have any other desired shape, such as a trapezoidal shape. The illustrated walls 304A1 and 304B1 have three openings formed therein. Alternatively, the upper track 304 may also have any desired number of first openings 374 and second openings 376 formed therein.

In the illustrated embodiment, the upper track 304 includes a plurality of first openings 375 formed in the first wall 304A2, and a plurality of second openings 377 formed in the second wall 304B2, and horizontally aligned with the first openings 375. The openings 375 and 377 are spaced from one another along a portion of the length of the walls 304A2 and 304B2, respectively. The illustrated first openings 375 are substantially rectangular in shape, although the first openings 375 may have any other desired shape, such as a trapezoidal shape. The illustrated walls 304A2 and 304B2 have four openings formed therein. Alternatively, the upper track 304 may also have any desired number of first openings 375 and second openings 377 formed therein.

On the free-play side 300A of the seat track assembly 300, the lower track 302 includes a first wall 302A1 and a second wall 302B1. On the load side 300B of the seat track assembly 300, the lower track 302 includes a first wall 302A2 and a second wall 302B2. The second walls 302B1 and 302B2 extend upwardly from lateral edges of a substantially planar base plate 302C. The first walls 304A1 and 304A2 are substantially parallel with the second walls 302B1 and 302B2.

In the illustrated embodiment, the lower track 302 includes a plurality of third openings 378 formed in the first wall 302A1. The lower track 302 also includes a plurality of third openings 379 formed in the first wall 302A2. The openings 378 are horizontally aligned with the first and second openings 374 and 376, and the openings 379 are horizontally aligned with the first and second openings 375 and 377. The wall 302A1 and 302A2 may have a relatively large number of openings 378 and 379, respectively, permitting numerous positions of the seat 10 relative to the vehicle floor 18 when locked, as will be explained below. The illustrated openings 378 and 379 are substantially rectangular in shape, although the openings 378 and 379 may have any other desired shape, such as a trapezoidal shape. The lower track 302 may have any desired number of third openings 378 and 379 formed therein.

In the illustrated embodiments, the PEL 306 is disposed within the interior space or cavity 301 of the track assembly 300 between the lower and upper tracks 302 and 304. A portion of the PEL 306, such as visible in FIG. 8, extends outwardly (upwardly when viewing FIGS. 8, 13, and 14) through an opening 303 formed in the top plate 304C of the upper track 304. An advantage of this configuration is that the PEL 306 occupies a smaller volume of space than a conventional locking mechanism in which most of the locking mechanism is located outside of the cavity 301.

FIGS. 13 and 14 are cross section elevational views of the longitudinal seat track assembly 300. FIG. 13 illustrates a first pin, such as the pin 330A, urged outwardly through the first wall 304A1, the first wall 302A1, and the second wall 304B1 a maximum distance.

FIG. 14 illustrates a locking pin, such as the locking pin 332B, urged outwardly through the first wall 304A2, the first wall 302A2, and the second wall 304B2 a maximum distance.

The first pin 330A is carried by the second or upper track 304 and is slidably movable between an engaged position such that the first pin 330A extends through one of the plurality of openings 378 formed in the first wall 302A1 of the lower track 302 and a disengaged position such that the first pin 330A is retracted from the opening 378. Similarly, the second pin 332A is carried by the upper track 304 and is slidably movable between an engaged position such that the pin 332A extends through one of the plurality of openings 379 formed in the first wall 302A2 and a disengaged position such that the pin 332A is retracted from the opening 379

In operation, as best shown in FIG. 13, the first lever 316 may be rotated by a portion of a PEL actuator 400, described below, in the direction of the arrow A1 (clockwise when viewing FIGS. 13 and 14), thereby causing the second lever 318 to rotate in the direction of the arrow B1 (counterclockwise when viewing FIGS. 13 and 14). As best shown in FIG. 14, the first lever 316 then contacts the spring flange 368 of the locking pins 332A, 332B, 332C, and 332D, and urges the locking pins 332A, 332B, 332C, and 332D inwardly (in the direction of the arrow D1), and causing the locking pins 332A, 332B, 332C, and 332D to disengage the first wall 304A2 and the second wall 304B2.

An exemplary embodiment of a PEL actuator is shown at 400 in FIGS. 16 and 17. The PEL actuator 400 includes a pivot/mounting rod 402 attached between opposing seat track assemblies 300. A cap or mounting portion 404 is attached to either the first lever 316 or the second lever 318, depending on the sided of the seat 10 that PEL actuation is desired. A release handle 406 extends forwardly from the pivot/mounting rod 402. A first or forward end 408A of a release arm 408 extends rearwardly from the pivot/mounting rod 402. A second or rearwardly facing end 408B of the release arm 408 is biased into engagement with an upwardly facing surface 404A of the mounting portion 404 by a spring 410. When the release handle 406 is moved upwardly, the rearwardly facing end 408B of the release arm 408 urges the upwardly facing surface 404A of the mounting portion 404 downwardly, thus causing the lever 318 to rotate in the direction of the arrow A1, as described above.

Likewise, as best shown in FIG. 13, the second lever 318 contacts the spring flange 360 of the pins 330A, 330B, 330C, and urges the pins 330A, 330B, 330C inwardly (in the direction of the arrow C1), and causing the pins 330A, 330B, 330C to disengage the first wall 302A1 and the second wall 304B1. When the free play elimination pins 330A, 330B, 330C, and the locking pins 332A, 332B, 332C, and 332D are disengaged from the first wall 302A and the second wall 304B, the upper track 304 can slide relative to the lower track 302.

In the embodiments illustrated herein, three pins 330A, 330B, 330C are provided. The three pins 330A, 330B, 330C substantially eliminate free-play. After the release handle 406 is released, and the pins 330A, 330B, 330C and the locking pins 332A, 332B, 332C, and 332D of the PEL 306 are urged into positions engaging the walls 304A1, 304A2, 302A1, 302A2, and 304B1 and 304B2 (such as shown in FIG. 15), at least two pins 330A, 330B, 330C will always engage both the upper track 304 and the lower track 302. Therefore, when the seat 16 is moved forwardly or rearwardly, at least two pins 330A, 330B, 330C will engage both the upper track 304 and the lower track 302, thereby substantially eliminating free-play.

In the embodiments illustrated herein, when the release handle 406 is released, at least three of the locking pins 332A, 332B, 332C, and 332D (the locking pins 332B, 332C, and 332D in FIG. 15), extends through the openings 375, 379, and 377 in each of the three walls 304A2, 302A2, and 304B2, respectively, thus further securing the upper track 304 relative to the lower track 302. Because the three locking pins 332B, 332C, and 332D engage both walls 304A2 and 304B2 of the upper track 304, the load performance of the seat track assembly 300 during an impact or crash event is improved. The locking pins 332B, 332C, and 332D also act to substantially reduce bending force on the walls, 304A2, 302A2, and 304B2 that may occur during an impact or crash event.

Advantageously, the operation of the PEL 306 is split such that the pins 330A, 330B, 330C extend outwardly toward, and engage the free-play elimination side 300A of the seat track assembly 300, and the locking pins 332A, 332B, 332C, and 332D extend outwardly toward, and engage a load side 300B opposite the free-play elimination side 300A.

FIG. 15 illustrates exemplary alternate positions of the pins 330A, 330B, 330C and the locking pins 332A, 332B, 332C, and 332D relative to the tracks 302 and 304 depending on the relative positions of the first, second, and third openings 374, 375, 376, 377, 378, and 379.

For example, FIG. 15 shows the locking pins 332B, 332C, and 332D fully outwardly extended such that they extend through the walls 304A2, 302A2, and 304B2, while the locking pin 332A extends only through wall 304A2.

In the embodiment illustrated in FIG. 15, the pins 330A and 330C are urged outwardly a maximum distance through the walls 304A1, 302A1, and 304B 1, such that a surface of the pins 330A and 330C engage openings 378 of the wall 302A1 at points of contact indicated at 380 and 382, respectively, thereby urging the pins 330A and 330C slightly laterally outwardly (i.e., substantially perpendicularly to a longitudinal axis of the pins 330A and 330C). The pins 330A and 330C are thereby urged slightly laterally into engagement with the openings 374 as indicated at 384 and 388. An end of the pin 330B will also engage the wall 302A1.

Additionally, as shown in FIG. 15, each pin 330A and 330C engages the PEL 306 at three points. As the tapered end of the pin 330A engages the opening 378 of the wall 302A at the contact point 380, the pin 330A is urged slightly laterally outwardly. The pin 330A then engages the first opening 374 of the wall 304A at the contact point 384, and further engages the pin groove 392 of the load bracket 320 at the contact point 386. Similarly, the tapered end of the pin 330C engages the opening 378 of the wall 302A at the contact point 382. The pin 330C is then urged slightly laterally outwardly. The pin 330C then engages the first opening 374 of the wall 304A1 at the contact point 388, and further engages the pin groove 392 of the load bracket 320 at the contact point 390.

The three points of contact of the pins 330A and 330C with the PEL 306, and the positions of each pin relative the other, wherein the longitudinal axis of the pins 330A and 330C are not parallel, ensure that two pins (330A and 330C in FIG. 15) remain engaged at three contact points each, thereby substantially eliminating free play of the seat track assembly 300.

Advantageously, the PEL 306 is structured such that when the PEL is in a locked position, two of the pins 330A, 330B, and 330C are always extended a maximum distance outwardly and engage the PEL at three points of contact as shown in FIG. 15.

Referring now to FIG. 18, a third embodiment of a portion of a lower track is shown schematically at 502, and a portion of a third embodiment of the PEL is shown schematically at 512. The lower track 502 is similar to the lower track 302 and includes a first wall 502A1 substantially similar to the first wall 302A1 and a second wall 502A2. The first wall 502A1 includes openings 504 substantially similar to the openings 378. The free-play elimination pins schematically illustrated at 506A, 506B, and 506C are substantially similar to the free-play elimination pins 330A, 330B, and 330C, respectively.

The second wall 502A2 includes openings 510 having a width smaller than a width of the openings 379 in the second wall 302A2. The locking pins 508A, 508B, and 508C are substantially similar to the locking pins 332A through 332D. In the illustrated embodiment of the PEL 512 only three locking pins 508A, 508B, and 508C are provided. It will be understood that the operation of the PEL 512 is substantially similar to the operation of the PEL 306 described above.

It will be understood that in the engaged position, at least two of the locking pins 508A, 508B, and 508C will also extend through openings in both walls of the upper track (not shown in FIG. 18, but substantially similar to the walls 304A2 and 304B2 of the upper track 304 shown in FIG. 15. Because two of the three locking pins 508A, 508B, and 508C engage both walls of the upper track, the load performance of the associated seat track assembly is improved during an impact or crash event.

The principle and mode of operation of the vehicle seat track assembly have been described in its preferred embodiment. However, it should be noted that the vehicle seat track assembly described herein may be practiced otherwise than as specifically illustrated and described without departing from its scope.

What is claimed is:

1. A vehicle seat track assembly comprising:
a first track having first and second spaced apart walls, wherein each of said first and second walls includes a plurality of openings formed therein;
a second track slidably mounted relative to said first track; and
a locking mechanism including:
a first pin carried by said second track and axially movable between an engaged position, wherein said first pin extends through one of the plurality of openings formed in said first wall of said first track, and a disengaged position, wherein said first pin is retracted from said plurality of openings formed in said first wall of said first track; and
a second pin carried by said second track and axially movable between an engaged position, wherein said second pin extends through one of the plurality of openings formed in said first wall of said first track, and a disengaged position, wherein said second pin is retracted from said plurality of openings formed in said first wall of said first track;
wherein said first and second pins are also laterally movable relative to one another when moving into their respective engaged positions.

2. The vehicle seat track assembly according to claim 1, wherein said locking mechanism defines a positively engaged locking (PEL) mechanism.

3. The vehicle seat track assembly according to claim 1, further including a plurality of first pins.

4. The vehicle seat track assembly according to claim 3, wherein in the engaged position, at least two first pins extend through one of the plurality of openings formed in said first wall of said first track.

5. The vehicle seat track assembly according to claim 4, wherein each of said at least two first pins engage said first track within said opening in said first wall.

6. The vehicle seat track assembly according to claim 5, wherein said second track has first and second spaced apart walls; and wherein each of said first and second walls includes a plurality of openings formed therein.

7. The vehicle seat track assembly according to claim 6, wherein in the engaged position, each of said at least two first pins further engage said second track within said opening in said first wall.

8. The vehicle seat track assembly according to claim 7, wherein said first pins are slidably mounted to a housing portion; and wherein in the engaged position, each of said at least two first pins further engage said housing portion.

9. The vehicle seat track assembly according to claim 1, further including a plurality of second pins.

10. The vehicle seat track assembly according to claim 9, wherein in the engaged position, at least three second pins extend through one of the plurality of openings formed in said second wall of said first track.

11. The vehicle seat track assembly according to claim 10, wherein each of said at least three second pins engage said first track within said opening in said second wall.

12. The vehicle seat track assembly according to claim 11, wherein said second track has first and second spaced apart walls; and wherein each of said first and second walls includes a plurality of openings formed therein.

13. The vehicle seat track assembly according to claim 12, wherein in the engaged position, each of said at least three second pins further engage said second track within said opening in said first wall.

14. The vehicle seat track assembly according to claim 13, wherein said second pins are slidably mounted to a housing portion.

15. The vehicle seat track assembly according to claim 14, wherein in the engaged position, each of said at least three second pins further engage said housing portion.

16. The vehicle seat track assembly according to claim 9, wherein the plurality of second pins includes a pair of connected second pins; and wherein in the engaged position, each of said pair of connected second pins extend through one of the plurality of openings formed in said second wall of said first track.

17. The vehicle seat track assembly according to claim 1, further including first and second actuators carried by said second track and pivotally mounted relative to said second track.

18. The vehicle seat track assembly according to claim 17, wherein said second track has first and second spaced apart walls defining an interior space therebetween; and wherein said first and second pins are disposed within said interior space of said second track when said first and second pins are in their respective disengaged positions.

19. The vehicle seat track assembly according to claim 18, wherein said first and second pins and said first and second actuators are mounted within a housing; and wherein said housing, said first and second pins, and said first and second actuators define a vehicle seat track assembly sub-assembly.

20. The vehicle seat track assembly according to claim 19, wherein said sub-assembly is mounted to said second track within said interior space of said second track.

* * * * *